United States Patent [19]

Vastagh

[11] Patent Number: 4,736,100

[45] Date of Patent: Apr. 5, 1988

[54] OPTICAL LOOP ATTENUATOR SIMULATING AN OPTICAL SYSTEM

[75] Inventor: Richard E. Vastagh, Harrisburg, Pa.

[73] Assignee: AMP Incorporated, Harrisburg, Pa.

[21] Appl. No.: 891,707

[22] Filed: Jul. 31, 1986

[51] Int. Cl.$^4$ .................. H01J 5/16; H01J 40/14; G01N 21/00

[52] U.S. Cl. .................. 250/227; 356/73.1; 350/96.2

[58] Field of Search .......... 356/73.1; 350/96.2, 350/96.21, 96.22, 630, 616; 250/227, 216

[56] References Cited

U.S. PATENT DOCUMENTS

| | | | |
|---|---|---|---|
| 3,252,377 | 5/1966 | Kentes | 350/616 |
| 3,617,107 | 11/1971 | Chu | 350/630 |
| 3,628,039 | 12/1971 | Ochs | 250/551 |
| 3,745,325 | 7/1973 | Harvey | 350/630 |
| 3,999,837 | 1/1975 | Bowen et al. | 350/96 C |
| 4,081,258 | 5/1978 | Goell et al. | 356/73.1 |
| 4,497,575 | 2/1985 | Philipp | 356/73.1 |
| 4,657,397 | 4/1987 | Oehler et al. | 350/630 |

Primary Examiner—David C. Nelms
Assistant Examiner—Michael Messinger
Attorney, Agent, or Firm—Gerald K. Kita

[57] ABSTRACT

A simulator in the form of a loop back optical attenuator 10 intermates with an optical connector 6 and has an exterior surface 13 facing an optical emitter 4 and an optical detector 5 and is constructed to reflect optical emission from the emitter 4 to the detector 5 for test purposes.

9 Claims, 5 Drawing Sheets

OPTICAL LOOP ATTENUATOR SIMULATING AN OPTICAL SYSTEM

FIELD OF THE INVENTION

The invention relates to testing an item of optical equipment prior to installation of the equipment in an optical communications system, and especially to an inexpensive simulator that can be connected temporarily to an item of optical equipment.

BACKGROUND OF THE INVENTION

An optical communications system utilizes an optical carrier wave to transmit communications signals among various items of optical equipment that are coupled to the system and that use the system to communicate with one another. The system utilizes optical fiber cables for transmitting the carrier wave from one item of optical equipment to another. For example, an optical communications system may comprise a computer central processor unit, CPU, as one item of equipment, and a peripheral, such as a printer, as another item, and optical fiber cables linked between the CPU and Printer.

Each item of optical equipment is coupled to the system by way of an optical connector that is constructed for disconnect coupling with the optical fiber cables. A bidirectional system utilizes two optical cables, one for receiving optical signals from an item of optical equipment, and another for sending optical signals to the same item. Each item of optical equipment has an optical emitter for sending signals and optical detector for receiving signals. The optical connector for the item provides a disconnect coupling for both the optical emitter and the optical detector.

There is a need to test each item of optical equipment before installation into the communications system. Typically, this is done by simulation testing, whereby the emitter and detector of the item of optical equipment to be tested is connected to a simulator that simulates the optical system, and the operation of the item is tested as though the item were coupled into the system itself and not just the simulator.

The development of a simulator began with a device that was capable of generating special test signals or that was capable of indicating precise measurements. All of the testing was performed externally on the item of equipment being tested. As each item of optical equipment became increasingly complex, the need for testing became ever greater. In order to make the testing less expensive, there has evolved a trend toward using the internal capabilities of the equipment being tested to execute testing on itself. This evolution was feasible since the item being tested has become and continues to become improved with the addition of internal electronics that can be commanded to function, in conjunction with the simulator, to execute tests internally of the item itself. The result has been to eliminate expensive specialized testing equipment and associated testing procedures. The simulator for testing has been reduced from a device that produces complex signals or measurements, to a simplified loop back attenuator, which is defined as a communications signal path that forms a loop from the emitter to a detector of the same item of optical equipment, such that optical signals transmitted from the item under test is looped back to the same item and internally transmitted among its internal component parts. The loop back simulator purposely simulates a loss of signal intensity expected of a communications system in which the item would be installed subsequent to passing the testing procedure.

A known loop back simulator involves an optical fiber cable formed in a loop and having ends of the fiber connected with alignment ferrules. The loop is installed in an alignment fixture that will align the ends of the loop with the emitter and detector of the item to be tested. The alignment ferrules and the process of their assembly with an optical fiber is disclosed more completely in U.S. Pat. No. 3,999,837. This known simulator is costly due to the process of assembly and of polishing of the ends of the fiber as specified in the patent. The need for further reduction in cost is fulfilled by the invention.

SUMMARY OF THE INVENTION

The invention resides in a simulator that is constructed for disconnect coupling to an optical connector for bidirectional optical communications. The cost of the simulator is so low that it can be installed with every connector of the system and used as an inexpensive dust cover until disposed of. Fabrication of the simulator is accomplished without assembly of separate parts and without the time and expense of fabrication operations beyond that of forming the simulator to shape in a moulding apparatus.

A further aspect of the invention resides in a plug compatible shape for a loop back attenuator specifically for disconnect coupling to an existent optical connector for an emitter and detector of an item of optical equipment.

A simulator in the form of a loop back attenuator of the invention incorporates an air gap as the transmission path for an optical carrier wave emitted by the item under test. A reflective surface or prism loops back the carrier wave to the item under test to provide an input signal for test purposes. Low cost is achieved by having the reflective surface or prism on the exterior of the loop back attenuator and formed entirely by a single operation, namely moulding a plastics material selected with a reflective quality or transmissive prism quality. The intensity of the optical emission can be reduced to simulate that of the operating environment in which the item under test will be used, by selecting the length of the loop back path, or the reflective or transmissive quality of the material, or of its surface quality, or the apportioned amount of total optical emission to be looped back to the item itself, or the selection of angular tilt of the reflective surface or surfaces to adjust the apportioned amount of optical emission to be looped back to the item.

An object of the invention is to provide a simulator in the form of a loop back attenuator of low cost and serving as a disposable dust cover for an optical connector for bidirectional optical communications.

Another object is to fabricate a simulator in the form of a loop back attenuator without assembly of separate parts and without the time and expense of fabrication operations beyond that of forming the simulator to shape in a moulding operation.

A further object of the invention is to provide a simulator in the form of a loop back attenuator in which a prism or reflective surface loops back an optical carrier wave for test purposes and an air gap serves as a transmission path for the carrier wave.

A still further object is to provide a simulator in the form of a loop back attenuator to simulate optical waveguide intensity of an operating environment for an item of optical equipment by selecting the length of the loop back path, the reflective or transmissive quality for the material and its surface quality or the apportioned amount of the total optical emission of the item under test to be looped back to the item itself.

These and other advantages of the invention are apparent and disclosed by way of example by a following detailed description and accompanying drawings.

DETAILED DESCRIPTION

Figure 1:
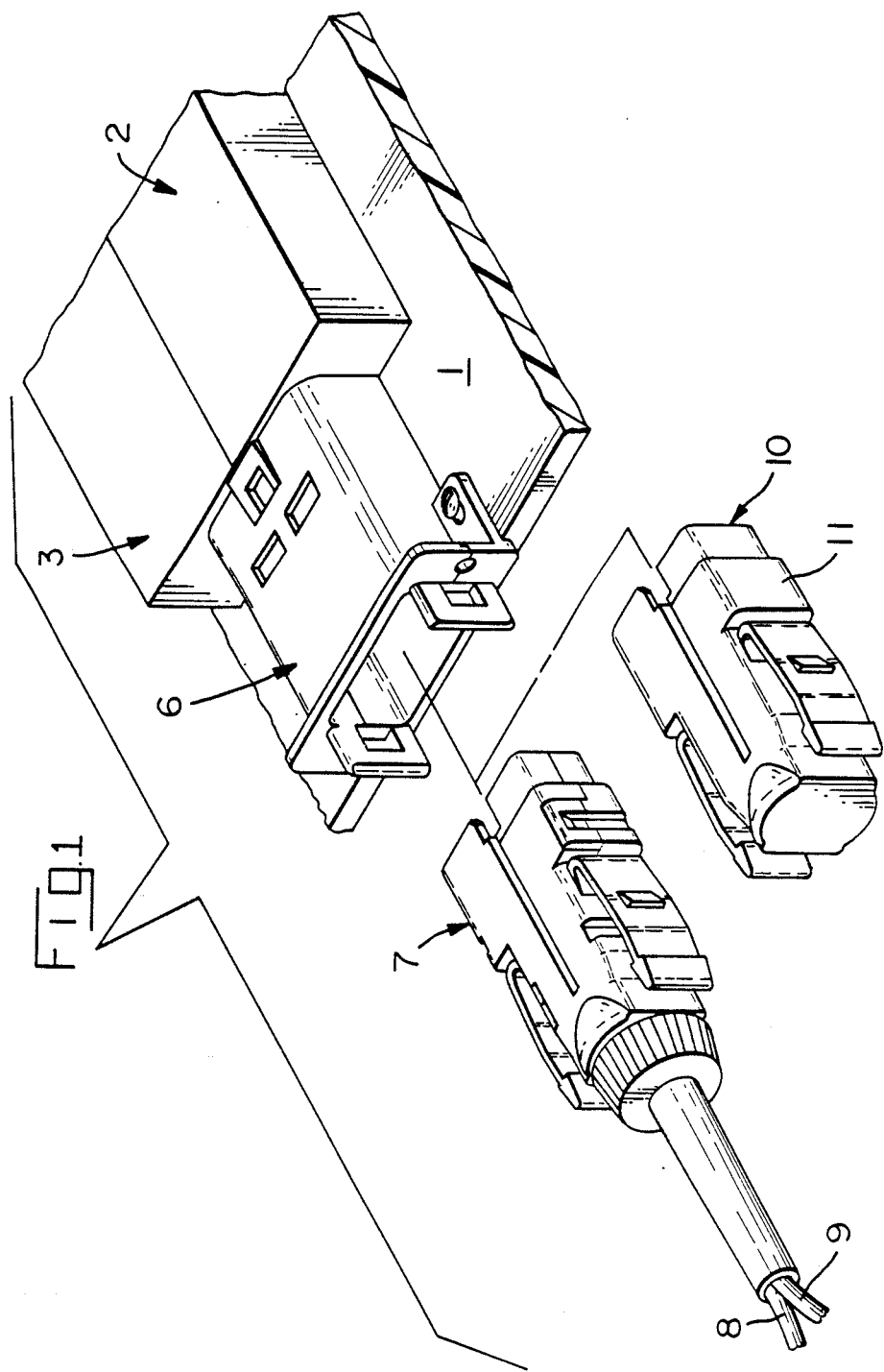
FIG. 1 is a perspective view of a simulator adapted for disconnect connection, in place of a shown connector for optical fiber cable, with a complementary optical connector mounted on a circuit board together with an optical detector and an optical emitter.

With more particular reference to the drawings, FIG. 1 shows a portion of a printed circuit board 1 of a type found internally of an item of optical equipment, not shown, that has an optical transmitter 2 and an optical receiver 3. The transmitter 2 is commercially available from AMP Incorporated, Harrisburg, Pa., and is known by part number 501342-1 and rated for performance at 100 Megabytes per second over a carrier wave of 815 nanometers wavelength. The receiver 3 is similarly rated and similarly available and has part number 501343-1. In reference to FIG. 2, an optical emitter 4 of the transmitter 2 and an optical detector 5 of the optical receiver 3 are adjacent each other and are received by an optical connector 6 that is mounted on the circuit board 1 and that is constructed for disconnect coupling with a complementary connector 7 provided with optical fiber cables 8, 9 that are part of a bidirectional communications system, not shown, to which the transmitter 2 and receiver 3 are coupled for bidirectional optical communication with other items of the system. Further details of the connectors 6, 7 are disclosed in U.S. patent application, Ser. No. 618,861, filed June 8, 1984.

A simulator 10 in the form of a loop back attenuator 10 is shown in FIG. 1 and is constructed for disconnect coupling with the connector 6 and which simulates the optical attenuation of the system to which the transmitter and receiver is coupled for bidirectional communication. The attenuator 10 provides a loop back optical path that receives the optical emission from the emitter 4 and reflects the optical emission along the loop back path to the detector 5 for use in testing the operation of the item of optical equipment in which the transmitter 2 and receiver 3 are incorporated. The attenuator 10 comprises a solid body 11 of insulative plastics material formed by moulding into a shape that has an exterior with dimensions that intermate with the optical connector 6 and thereby serves as a substitute for the connector 7 associated with the optical fiber cables 8, 9. The same moulding apparatus used to form the exterior of the connector 7 can be duplicated readily and at low cost for use in moulding the exterior of the attenuator 10 for plug compatibility with the connector 6 associated with the emitter 4 and detector 5. The simulator serves as a low cost dust cover for the emitter 5 and the detector 6.

FIGS. 2 through 6 each shows a simulator 10 with an exterior stationary surface 12 formed by moulding. The simulator 10 is depicted in section to illustrate the details thereof. A portion 13 of the exterior surface 11 facing the emitter 4 and detector 5 is constructed to receive optical emission from the emitter 4 and reflect the optical emission for receipt by the detector 5. The simulator 10 forms an optical loop back path for the optical emission through an air gap separating the portion 13 of the exterior surface 12 from the detector 5 and emitter 4. The optical emission undergoes a loss of intensity, or attenuation, as it propogates along the loop back optical path. The attenuation is selected to simulate an optical signal of reduced intensity, that is attributed to an optical carrier wave of an optical system, not shown, in which the emitter 4 and detector 5 are installed. The material is an organic polymer or liquid crystal polymer capable of fabrication by moulding to a shape and reflective surface quality of that of the polymer formed against a mould surface while the polymer is in a flowable material state.

Figure 2:
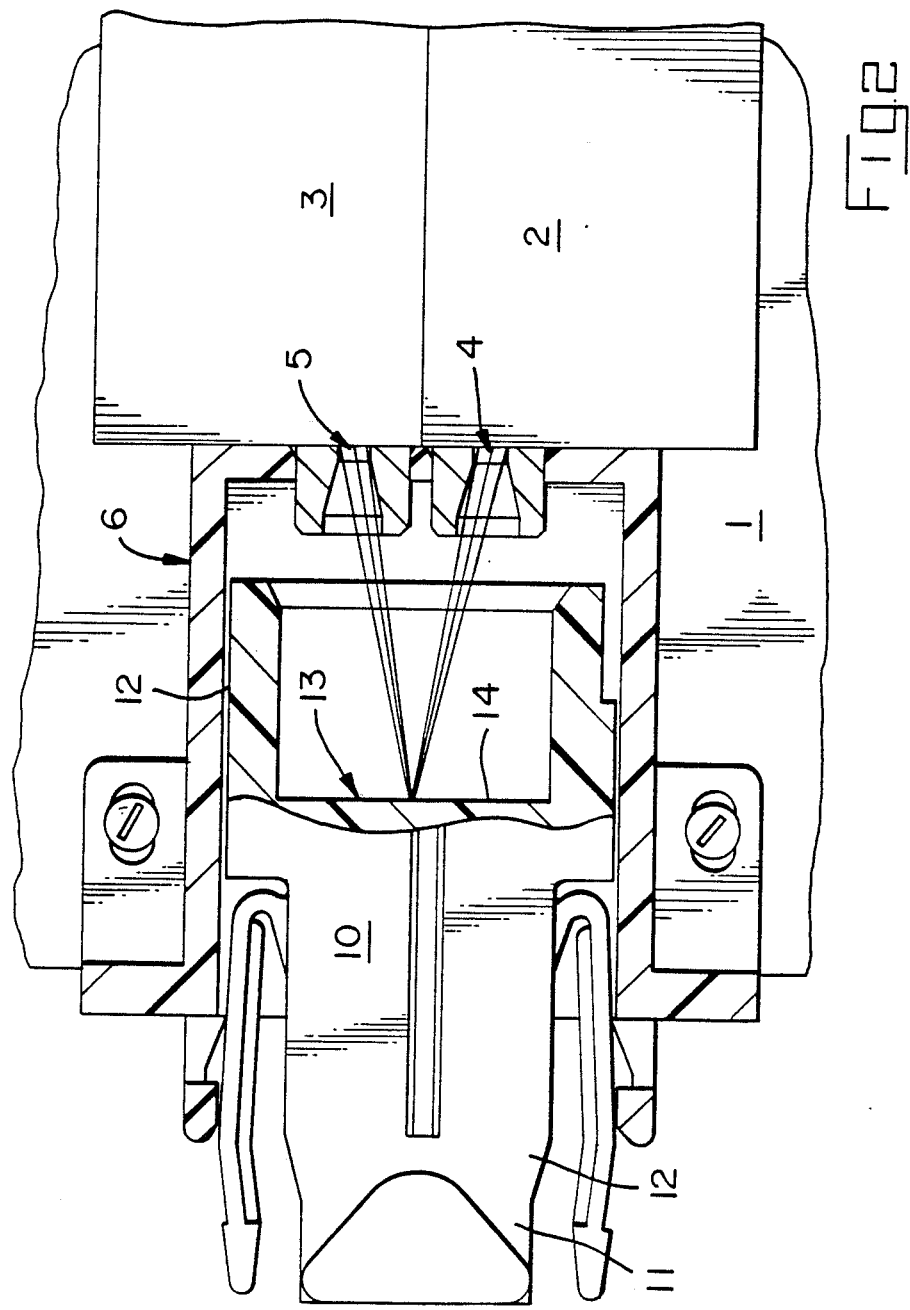
FIG. 2 is a diagrammatic view of a simulator having a front surface reflector.

In FIG. 2, the portion 13 of the exterior surface 12 of the simulator 10 is formed with a front reflector surface 14 positioned at a corresponding angle of zero degrees to the emitter 4 and at a corresponding angle of zero degrees to the detector 5. As shown, the surface 14 is continuous and planar. However, the surface 14 may be a series of planar surfaces, not shown. The surface 14 is positioned at a selected distance from the emitter 4 and detector 5, such that the total optical emission, comprising an optical signal, emanating from the emitter 4 is received by the surface 14 and only a portion of the optical emission, shown diagrammatically by the arrows, is reflected by the surface 14 back to the detector 5 as an optical signal supplied to the detector 5 for test purposes. The remainder of the total optical emission is reflected away from the detector 5 and comprises the attenuation of the total optical emission.

Figure 3:
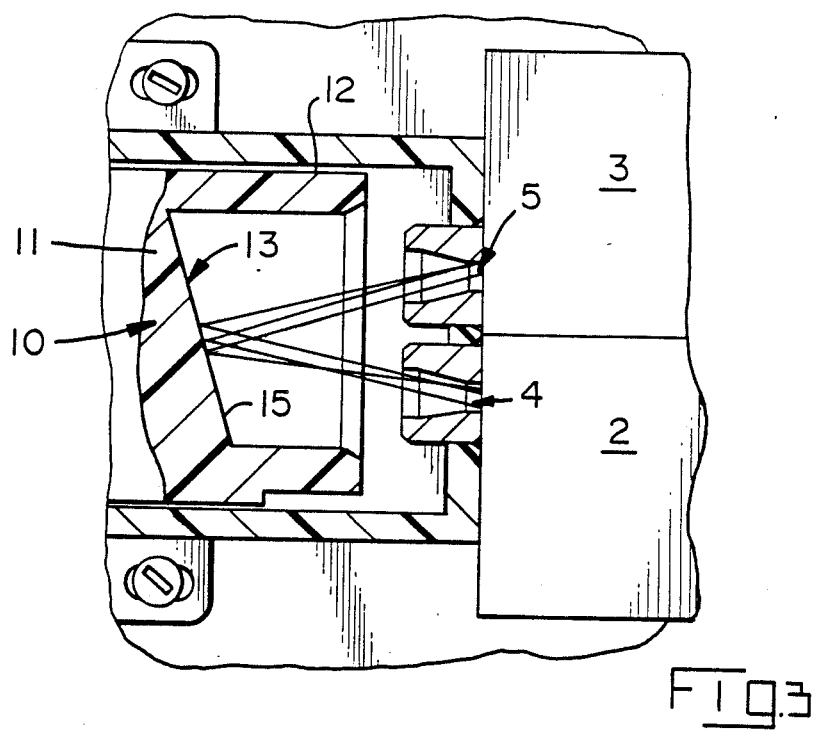
FIG. 3 is a diagrammatic view of a simulator having an angular front surface reflector.

FIG. 3, the portion 13 of the exterior surface 12 of the simulator 10 is formed with a front reflector surface 15 positioned at a corresponding oblique angle to the emitter 4 and at a corresponding oblique angle to the detector 5. As shown, the surface 15 is continuous and planar. However, the surface 15 also may be a series of planar surfaces, not shown. Optical emission emanating from the emitter 4 is received by the surface 15 and only a portion of the optical emission, shown diagrammatically by the arrows, is reflected by the surface 15 back to the detector 5. The remainder of the total optical emission is reflected away from the detector 5 and comprises the attenuation of the total optical emission.

Figure 4:
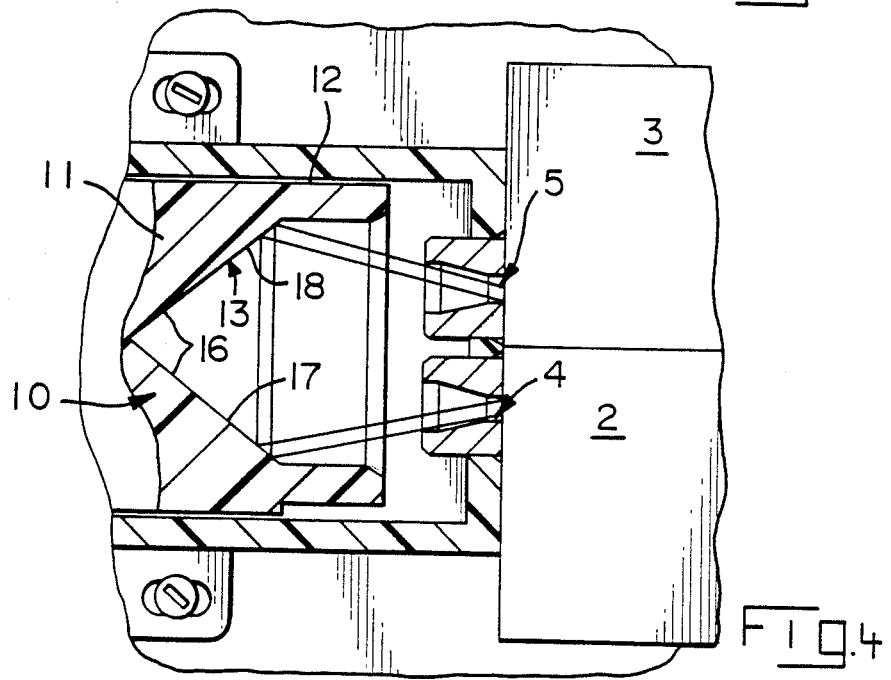
FIG. 4 is a diagrammatic view of a simulator having a front surface reflector with reflective surfaces at angles converging toward each other.

FIG. 4, the portion 13 of the exterior surface 12 of the simulator 10 is formed with a front reflector surface 16 positioned at a corresponding oblique angle to the emitter 4 and at a corresponding oblique angle to the detector 5. The oblique angles converge toward each other to reflect the optical emission from one oblique part 17 of the surface 16 to the other oblique part 18 of surface 16. Optical emission emanating from the emitter 4 is received by the part 17 of surface 16 and only a portion of the optical emission, shown diagrammatically by the arrows, is reflected by the part of the surface 16 back to the detector 5 along an optical path of parallel course. The remainder of the total optical emission is reflected away from the detector 5 and comprises the attenuation of the total optical emission.

Figure 5:
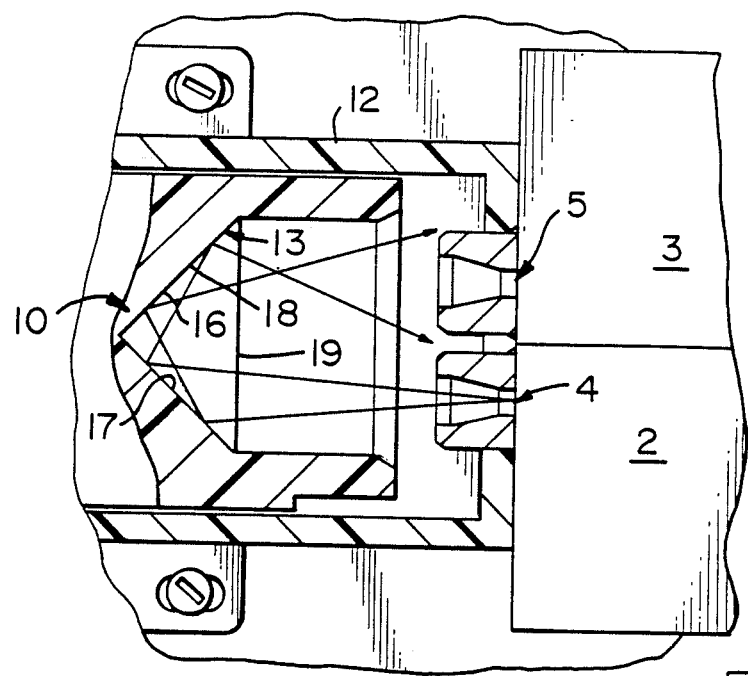
FIG. 5 is a diagrammatic view of a simulator having a retroeflective prism.

In FIG. 5, the portion 13 of the exterior surface 12 of the simulator is formed as in the embodiment shown in FIG. 4, with a front reflector surface 16 positioned at a corresponding oblique angle to the emitter 4 and at a corresponding oblique angle to the detector 5. A translucent prism 19 is inserted in the air gap to vary the optical propogation by refraction. A portion of the optical emission is reflected along an optical path of diverging course, as compared with the parallel course shown in FIG. 4, without the prism 19.

Figure 6:
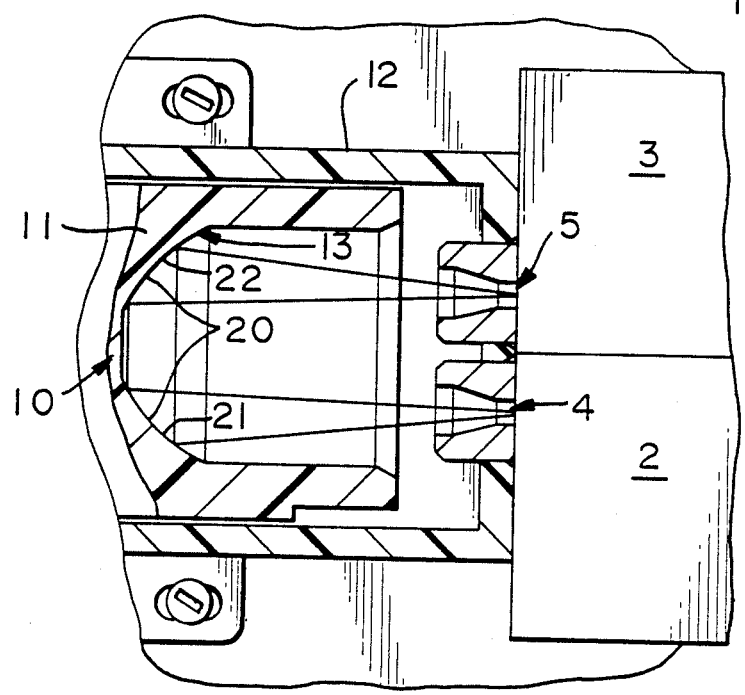
FIG. 6 is a diagrammatic view of a simulator having a front surface reflector with segmented aspheric reflective surfaces.

In FIG. 6, the portion 13 of the exterior surface 12 of the simulator 10 is composite planar and is formed with a front reflector surface 20 formed with concave and segmented aspheric surfaces 21, 22 of reflection positioned at corresponding oblique angles to the emitter 4 and to the detector 5. The oblique angles converge toward each other to reflect the optical emission from one surface 21 to the other surface 22. Optical emission emanating from the emitter 4 is received by the surface 21 and only a portion of the optical emission, shown diagrammatically by the arrows, is reflected by the surfaces 21, 22 back to the detector 5 along an optical path of converging breadth. The remainder of the total optical emission is reflected away from the detector 5 and comprises the attenuation of the total optical emission.

The attenuation of the optical emission propogating in the loop back optical path is adjustable. The following examples demonstrate the manner in which the attenuation is adjusted to a selected value.

EXAMPLE 1

Figure 7:
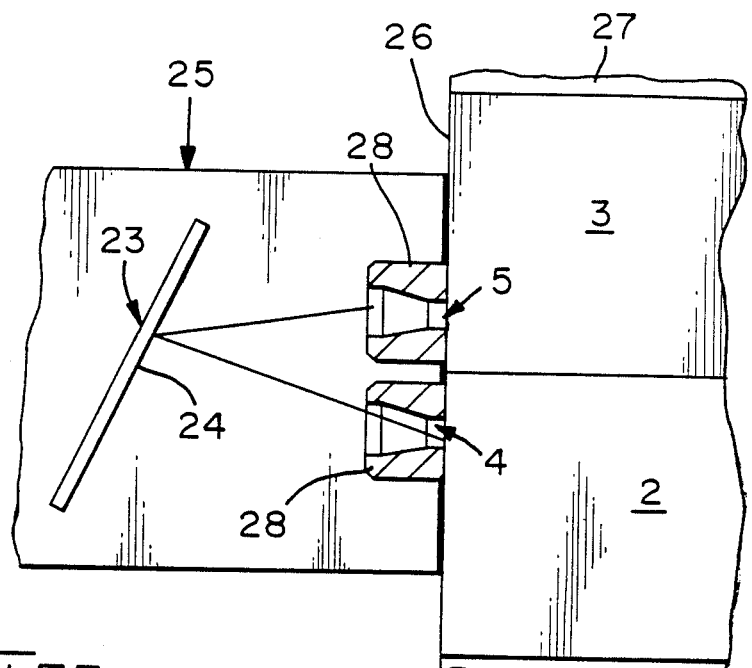
FIG. 7 is a diagrammatic view of a test fixture for a test fixture with an angular front surface reflector.

FIG. 7 shows a test of the optical loop back capability of a flat planar sample 23 of a liquid crystal polymer that is commercially available from Celanese Corporation, Specialty Operations, 86 Morris Avenue; Summit, N.J. 07901, and is known by the brand name, Vectra 950. The polymer is selected for its capability of being formed to a desired shape by a moulding operation and for a reflective surface quality when formed during a moulding operation against a mould surface while in a flowable state. A flat planar reflective surface 24 of the polymer sample 23 is mounted on a fixture block 25 and is located at a distance of 37.725 millimeters from an end 26 of a fixture block 27. The emitter 4 and detector 5 are mounted in sockets 28, 28 and are positioned to emit and receive optical emission perpendicular to the end 26. A distance of 0.5 inches separates the central axes of the emitter 4 and detector 5. The emitter 4 has a measured optical output signal of 155 millivolts DC at 815 nanometers wavelength. According to an operation in performance of a test, a standard optical fiber cable assembly, not shown, of 1 meter length is connected between the sockets 28, 28. The signal of the emitter 4 is transmitted over the cable assembly to the detector 5 and the intensity of the signal is measured at the detector 5 and the intensity of the signal is measured at the detector 5 and recorded. The cable assembly is removed, the polymer sample 23 is positioned, as described above. The optical signal from the emitter 4 is reflected from the surface of the polymer sample 23 to the detector 5, and the intensity of the reflected signal is measured at the detector 5. A comparison between the two measured intensities of signal indicated a twelve decibel attenuation when the sample 23 was substituted for the standard cable assembly as the optical loop back path. The surface of the polymer sample 23 was roughened to reduce its reflectivity. Measured intensity of the reflected signal from the roughened surface indicated increased attenuation as compared with the same surface prior to being roughened.

EXAMPLE 2

Figure 8:
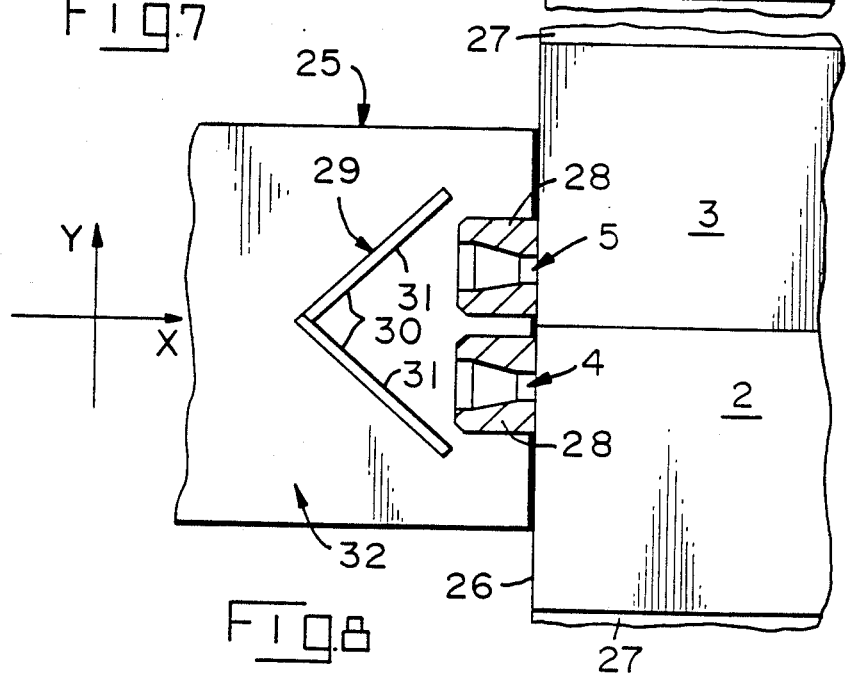
FIG. 8 is a diagrammatic view of a test fixture for a simulator with reflective surfaces at converging angles.

A polymer sample 29 of Vectra 900 has a reflector surface 20 formed by moulding into two flat planar surfaces 31, 31 of reflection that converge toward each other. The sample 29 is mounted on the fixture block 25. The surfaces 31, 31, converge at a vertex of an angle that is varied from 95 degrees to 100 degrees and then to 105 degrees. The vertex of the angle is located 0.8125 inches from an end 26 of a fixture block 27 that carries the emitter 4 and the detector 5 mounted in the sockets 28, 28 as shown in FIG. 8 of the connector. Optical emission from the emitter 4 is reflected from one surface 31 to the other surface 31 and then to the detector 5. The intensity of the reflected optical signal is measured in millivolts DC at the detector 5. The relative positions of the blocks 25, 26 are changed in micrometer units along the X axis and along the Y axis, and a measurement of intensity is recorded according to the following table of recordations. The table indicates adjustments of attenuation in the power of the reflected signal resulting from changes in the length of the loop back path, the angles of the reflected signals with respect to the emitter and the detector, and the alignment with the axis of the detector and with the axis of the emitter.

| X axis | Y axis | Angle degrees | Power, Mv DC |
| --- | --- | --- | --- |
| 0 | 0 | 105 | 166.8 |
| 1000 | 0 | 105 | 162.5 |
| 2000 | 0 | 105 | 158 |
| 3000 | 0 | 105 | 153 |
| 4000 | 0 | 105 | 147 |
| 0 | 0 | 100 | 253 |
| 1000 | 0 | 100 | 245 |
| 2000 | 0 | 100 | 240 |
| 3000 | 0 | 100 | 228 |
| 4000 | 0 | 100 | 224 |
| 0 | 0 | 95 | 252 |
| 1000 | 0 | 95 | 245 |
| 2000 | 0 | 95 | 236 |
| 3000 | 0 | 95 | 230 |
| 4000 | 0 | 95 | 220 |
| 0 | +2000 | 105 | 152 |
| 0 | +1000 | 105 | 164 |
| 0 | −1000 | 105 | 161 |
| 0 | −1000 | 105 | 161 |
| 0 | −2000 | 105 | 150 |
| 0 | +2000 | 100 | 135 |
| 0 | +1000 | 100 | 146 |
| 0 | −1000 | 100 | 153 |
| 0 | −2000 | 100 | 152 |
| 0 | −3000 | 100 | 148 |
| 0 | −4000 | 100 | 144 |
| 0 | +3000 | 95 | 126 |
| 0 | +2000 | 95 | 151 |
| 0 | +1000 | 95 | 163 |
| 0 | −1000 | 95 | 157 |
| 0 | −2000 | 95 | 149 |
| 0 | −3000 | 95 | 141 |

The invention is described by way of the foregoing examples, and is not to be delimited from other modifications and embodiments that may be departures from the foregoing examples and yet are within the spirit and scope of the appended claims.

I claim:

1. A loop attenuator shaped to be interchangeable with a complementary connector that intermates with an optical connector having an optical emitter and an optical detector, the loop attenuator comprising; a body of solid material and being dimensioned with an exterior that matches the exterior of the complementary optical connector, thereby to intermate with the optical connector, the body having an exterior surface, the body having a reflective surface at the exterior surface and formed by moulding a portion of the exterior surface, and the reflective surface is constructed to receive optical emission from the emitter and reflect a selective portion of the optical emission for receipt by the detector, and thereby simulate an optical signal of reduced intensity, which optical signal is attributed to an optical system in which the emitter and the detector are installed.

2. A loop attenuator as recited in claim 1 wherein, the reflective surface is positioned at a corresponding angle with respect to the emitter and a corresponding angle with respect to the detector to reflect a portion of the total optical emission of the emitter to the detector.

3. A loop attenuator as recited in claim 1 wherein, the reflective surface is positioned at a distance from the emitter and at a corresponding distance from the detector to reduce the intensity of the reflected optical emission.

4. A loop attenuator as recited in claim 1 wherein, the solid material is a reflective material and is an organic polymer, and said portion of the exterior surface has a surface quality and shape of that the polymer formed against a mould surface while in a flowable state.

5. A loop attenuator as recited in claim 1 wherein, the reflective surface defines an optical path of reflection for the emission emanating from the emitter that simulates a specified loss of intensity as compared with a loss of intensity due to an optical path defined along an optical cable of specified length.

6. A loop attenuator as recited in claim 1 wherein, the reflective surface is planar along its length and positioned at the same corresponding angle with respect to the emitter and the detector.

7. A loop attenuator as recited in claim 1 wherein the reflective surface is composite planar and has two surfaces of reflection at angles converging toward to each other.

8. A loop attenuator as recited in claim 1 wherein, the reflective surface has concave and segmented aspheric surfaces of reflection positioned at angles converging toward each other.

9. A loop attenuator as recited in claim 1 wherein, the reflective surface is stationary.

* * * * *